United States Patent Office 3,845,048
Patented Oct. 29, 1974

3,845,048
TERPENE DERIVATIVES
Rene Baronnet, Paris, France, assignor to Societe Berri-Balzac, Paris, France
No Drawing. Continuation-in-part of abandoned application Ser. No. 160,182, July 6, 1971. This application Nov. 14, 1972, Ser. No. 306,434
Int. Cl. C07d 87/32
U.S. Cl. 260—247.7 E     8 Claims

ABSTRACT OF THE DISCLOSURE

This invention relates to hydronopol derivatives having the formula:

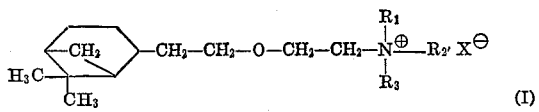

in which $R_1$ and $R_2$ are each alkyl groups, or, together with the nitrogen atom to which they are attached, form a heterocycle, $R_3$ is a benzyl optionally mono-, di- or tri-substituted with alkoxy or halogen and X is halogen.

Said derivatives are useful antispasmodic drugs.

---

This application is a continuation-in-part of copending application Ser. No. 160,182, filed July 6, 1971, and now abandoned.

This invention relates to new hydronopol derivatives, to a process for their preparation and to the application thereof particularly as therapeutically useful compositions.

Heino A. Luts et al., J. Pharm. Sciences, vol. 53, pp. 444, 445, 1964, have described hydronopol derivatives having analgesic and hypotensive activity.

Applicant has found new hydronopol derivatives having a musculotropic spasmolytic activity which are with respect to the described derivatives much less toxic and much more active.

Said new derivatives have the general formula

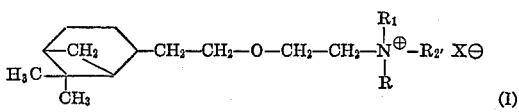

in which
X is halogen
$R_1$ and $R_2$ taken separately are alkyls having 1–6 carbon atoms and, taken together and with the nitrogen atom to which they are attached, form a 5–6 membered heterocycle containing a single nitrogen atom, and
$R_3$ is a member selected from the group consisting of benzyl, benzyl mono-, di- and tri-substituted with alkoxy having 1–6 carbon atoms or halogen.

To prepare derivatives (I), a 6,6-dimethyl-norpinane having the formula

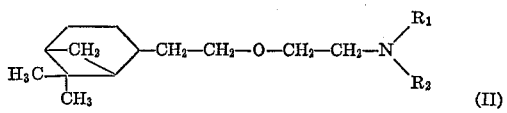

may be quaternized with a compound $R_3X$, $R_1$, $R_2$, $R_3$ and X having the above-defined meanings.

A process for the preparation of compounds (II) is described in French Patent Application 70/27 908, filed July 29th, 1970, by Applicant, for "Basic Diethyl Ether Derivatives, Process for Their Preparation and Applications Thereof."

This quaternization is conveniently carried out in a suitable anhydrous solvent, such as a ketone (e.g. acetone, methylethyl ketone) at its boiling temperature, with an excess of $R_3X$. When the latter is volatile, the reaction is conducted under pressure in an autoclave, at a pressure between 10 and 20 kg./cm.$^2$, for example.

To obtain the derivatives I in which X is Cl, the corresponding derivative in which X is Br may be prepared first and its solution may then be percolated through an anion exchange resin in OH form, after which the aqueous ammonium hydroxide solution eluted from the column may then be neutralized with hydrochloric acid.

The following examples illustrate the invention.

EXAMPLE 1.—N - benzyl - N-{2-[2-(6,6-dimethyl-norpinan-2-yl)-ethoxy]-ethyl} piperindinium bromide $R_3$=benzyl; Code No.=1708

Anhydrous acetone (250 ml.), 2-[2-(2-piperidino-ethoxy)-ethyl[-6,6-dimethyl-norpinane (27.9 g) and benzyl bromide (18.8 g.; 0.11 mole) are refluxed during twelve hours. The product crystallizes from acetone. It is suction-filtered and washed with ether, to give about 32 g. of product, m.p.=182° C.

The same procedure may be used to obtain the derivatives in which the piperidinium group is substituted by a dimethyl-ammonium, diethylammonium or morpholinium group.

EXAMPLE 2.—N,N-diethyl-N-(2-bromo-4,5-dimethoxy-benzyl - {2 - [2-(6,6-dimethyl-norpinan-2-yl)-ethoxy]-ethyl} ammonium bromide $R_3$=2-bromo-4,5-dimethoxybenzyl; Code No.=1712

2-[2-(2-diethylamino-ethoxy)ethyl] - 6,6-dimethyl-norpinane (26.7 g.; 0.1 mole) and 2-bromo-4,5-dimethoxybenzyl bromide (31 g.) are boiled during 8 hours in methyl ethyl ketone ethyl ketone (250 ml.).

The methyl ethyl ketone is concentrated, and a just sufficient amount of ether is added. The reaction mixture is alowed to crystallize, to give 50 g. of product, m.p.= 90° C.

The same procedure may be used to obtain the derivatives in which the diethylammonium group is substituted by a dimethyl ammonium, morpholinium or piperidinium group.

EXAMPLE 3.—N - (2 - bromo - 4,5-diethoxy-benzyl)-N-{2-[2-(6,6-dimethyl-norpinan-2-yl)-ethoxy[ethyl} morpholinium bromide $R_3$=2-bromo-4,5-diethoxy-benzyl; Code No.=1716

2-[2-(2-morpholino-2-ethoxy-ethyl)] - 6,6 - dimethyl-norpinane (2.81 g.; 0.01 mole) and 2-bromo-4,5-diethoxy-benzyl bromide (3.34 g.) are refluxed during eight hours in anhydrous isopropanol (250 ml.).

The solution is concentrated and a sufficient amount of ether is added thereto. The solution is then allowed to crystallize.

About 5 g . of crystalline quaternary ammonium derivative, m.p.=130° C., are collected.

EXAMPLE 4.—N - benzyl-N-N-dimethyl - {2-[2-(6,6-dimethyl-norpinan-2-yl)-ethoxy]-ethyl} ammonium chloride $R_3$: benzyl This compound is obtained from the corresponding bromide by anion exchange, operating as follows. An aqueous solution of 3 g. bromide in 25 ml. water is percolated through a column of an anion exchange resin in OH form (8 g. of resin for a column having a diameter of 1.2 cm. and a height of 30 cm.). The aqueous ammonium hydroxide solution eluted from the column is collected until the liquid has become neutral. The aqueous solution thus collected is then neutralized with hydrochloric acid and then concentrated to dryness, in vacuo. The residue is taken up into methyl ethyl ketone (3 ml.).

EXAMPLE 5.—N-benzyl-N-{-2-[2-(6,6-dimethyl-norpinan-2-yl)-ethoxy]-ethyl} pyrrolidinium bromide $R_3$=benzyl; Code No.=1721

Anhydrous methyl ethyl ketone (250 ml.), 2-[2-(2-pyrrolidino-ethoxy) - ethyl]-6,6-dimethyl-norpinane (26.5 g.; 0.1 mole) and benzyl bromide (18.8 g.; 0.11 mole) are refluxed during twelve hours. After evaporating the solvent, the residue is taken up into ether. Yield: 35 g. of product, m.p.=115° C.

In the following Table I are reported examples of derivatives (I) giving their code number (column 1), their structure (columns 2–5), their molecular weight, their percent halogen content, and their melting point in °C.

The antispasmodic activity of derivatives (I) is also markedly higher than that of the reference compound 1694 in which $R^3$ is methyl.

The derivatives which are tri-substituted are less toxic than the derivatives in which $R^3$ is benzyl and, for example, the toxicity of derivative 1717 is two times as low as papaverine hydrochloride.

Further, derivatives (I) have the following properties:

1—They exhibit no side pharmacological effect

2—They induce spasmolysis without modification of the peristalsis and alteration of the passage through the intestines 3—They act in situ and they pass through the digestive wall more difficulty than papaverine; that permits a selective action of the drug administrated per os.

TABLE I

| Code number | $R_1$ | $R_2$ | $R_3$ | $X^-$ | Molecular weight Calculated | Molecular weight Found | Percent bromine Calculated | Percent bromine Found | Melting point, °C. |
|---|---|---|---|---|---|---|---|---|---|
| 1691 | Ethyl | Ethyl | Benzyl | Br— | 438 | 439 | 18 | 18.5 | 125 |
| 1699 | Methyl | Methyl | do | Br— | 410 | 406 | 19.5 | 18.8 | 136 |
| 1703 | Morpholino | | do | Br— | 452 | 430 | 17.7 | 18.1 | 180 |
| 1712 | Ethyl | Ethyl | 2-bromo-4,5-dimethoxy-benzyl | Br— | 577 | 593 | 13.9 | 14.2 | 90 |
| 1715 | Methyl | Methyl | 2-bromo-4,5-diethoxy-benzyl | Br— | 577 | 587 | 13.9 | 13.8 | 78 |
| 1716 | Morpholino | | do | Br— | 619 | 629 | 12.9 | 12.5 | 130 |
| 1717 | Morpholino | | 2-bromo-4,5-dimethoxy-benzyl | Br— | 591 | 605 | 13.5 | 13.9 | ca 170 |
| 1720 | Ethyl | Ethyl | 2-bromo-4,5-diethoxy-benzyl | Br— | | | | | Hygroscopic |
| 1721 | Pyrrolidino | | Benzyl | Br— | 436 | 418 | 18.3 | 18.5 | 115 |
| 1722 | Piperidino | | 2-bromo-4,5-dimethoxy-benzyl | Br— | 589 | 576 | 13.55 | 13.75 | 163 |
| 1723 | Piperidino | | 2-bromo-4,5-diethoxy-benzyl | Br— | 617 | 622 | 12.95 | 12.70 | 102 |
| 1694 | Ethyl | Ethyl | Methyl | I— | | | Reference compound | | |

Derivatives (I) were found to possess both a papaverine-type musculotropic spasmolytic activity and an anticholinergic neurotropic activity.

In following Table II are reported results of pharmacological tests showing the comparative activities of a number of derivatives (I) and of derivative 1694 with respect to papaverine hydrochloride and atropine hydrochloride and the toxicity evaluated in mice by the method of Kärber und Behrens.

The determinations were carried out according to the conventional Magnus method in the ileum of guinea-pig. The minimum amount of product which, dissolved in 50 ml. of Tyrode's solution, is capable of effecting a 100% cancellation of the spasms within a period of time from one to five minutes is determined. Such spasms are produced by administration of 20γ of acetylcholine when it is desired to obtain evidence of the neutrotropic action and of 10 mg. of barium chloride when it is desired to demonstrate the musculotropic action.

TABLE II

| Code number | $LD_{50}$ mg./kg. per os | $LD_{50}$ mg./kg. I.V. | Spasmolytic activity Anticholinergic action With respect to atropine | Spasmolytic activity Anticholinergic action With respect to papaverine | Musculotropic action Relaxation 50% | Musculotropic action Relaxation 100% |
|---|---|---|---|---|---|---|
| 1691 | 330 | 5 | | x4 | | x2 |
| 1703 | 400 | 4 | | x10 | | x4 |
| 1708 | 540 | 10 | | x20 | | x4 |
| 1712 | 1,000 | 40 | x0.01 | x4 | | x4 |
| 1715 | 1,420 | 80 | x0.012 | x4 | x10 | x2.1 |
| 1717 | 1,400 | 66 | x0.012 | x7 | x7 | x6 |
| 1722 | 1,075 | 52 | x0.0075 | x4 | x4.5 | x2 |
| 1723 | 918 | 54 | x0.005 | x2 | x2 | x0.5 |
| 1694 | 400 | 4 | | x1 | | x0.7 |

It is apparent from this table that derivatives (I) possess a high antispasmodic activity:

Their musculotropic activity is very high. Thus the same effects are obtained with derivatives (I) as with papaverine hydrochloride, but at dosages which are, in some cases, ten times as small as with papaverine hydrochloride.

Their neurotropic (anticholinergic) spasmolytic activity is low with respect to atropine hydrochloride but is, on an average, 4 times as high as the activity of papaverine hydrochloride.

For example, the following results have been obtained with derivative 1717:

1—The peristalsis of guinea-pig ileum is maintained, while it is supressed for papaverine and analogous compounds.

2—The passage through the intestines in mice is only little perturbed at dosages of 10 mg./kg. I.V. and of 350 mg./kg. per os, i.e. at dosages corresponding to ⅓ of $LD_{50}$.

3—There is no disturbance on the central nervous system in mice and the derivative exhibits only a very low depressent activity.

The properties of derivative 1717 have been confirmed in vivo by the antagonism to contracturant effects of a parasympatheticomimetic compound on the unstriated intestinal fibers, the very low hypertensive activity on the arterial pressure and the slight ganglioplegic activity on the autonomous nervous system.

Therefore, it is apparent from the above disclosure that derivatives (I) are particularly useful antispasmodic drugs for the digestive tract.

For such applications, the drug is advantageously formulated for oral administration in an amount of from 1 to 2 mg. per unit dose, for topical administration as ointments and collyria in the form of 0.1% and 0.5% solutions in a pharmaceutically administrable liquid vehicle, or for parenteral administration at daily dosages of from about 0.5 mg. to about 2 mg. for a mammal weighing about 70 kg.

Various pharmaceutical formulations together with their applications are given below.

Suppositories

|  | G. |
|---|---|
| Derivative (I) | 0.010 |
| Excipient, to make | 3 |

Drops

|  | |
|---|---|
| Derivative (I) | 0.20 |
| Chloroform water, to make | 10 |

Application: Hepatology.

Injectable solution

Derivative (I) _____ 2
Normal saline, to make 100 ml. for distribution in 1 ml. ampoules.
Application: spasmolytic.

Coated tablets

For use in gastroenterology: Derivative (I) per coated tablet _____ 0.02
Applications: spasmoplegic, and in gynecology.

Having now described my invention what I claim and desire to secure by Letters Patent is:

1. A compound of the formula

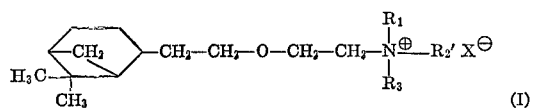

(I)

in which X is selected from the group consisting of chloro and bromo, $R_1$ and $R_2$ taken separately are alkyl having 1–2 carbon atoms and taken together with the nitrogen atom to which they are attached form a member selected from the group consisting of morpholino, piperidino and pyrrolidino, $R_3$ is a member selected from the group consisting of benzyl, 2-bromo-4,5-dimethoxy-benzyl and 2-bromo-4,5 diethoxy-benzyl.

2. N-(2-bromo - 4,5 - dimethoxy-benzyl)-N-{2-[2-(6,6-dimethyl-norpinan - 2 - yl)ethoxy]-ethyl} morpholinium bromide.

3. N,N-diethyl-N-(2-bromo - 4,5 - dimethoxy-benzyl)-{2-[2-(6,6 - dimethyl-norpinan - 2 - yl)ethoxy]ethyl} ammonium bromide.

4. N,N-dimethyl-N-(2-bromo - 4,5 - diethoxy-benzyl)-{2-[2-(6,6 - dimethyl-norpinan - 2 - yl)ethoxy]-ethyl} ammonium bromide.

5. N-(2-bromo - 4,5 - diethoxy-benzyl)-N-{2-[2-(6,6-dimethyl-norpinan - 2 - yl)ethoxy]-ethyl} morpholinium bromide.

6. N,N-diethyl-N-(2-bromo - 4,5 - diethoxy-benzyl)-{2-[2-(6,6 - dimethyl-norpinan - 2 - yl)ethoxy]-ethyl} ammonium bromide.

7. N-(2-bromo-4,5 - dimethoxy-benzyl)-N-{2-[2-(6,6-dimethyl-norpinan - 2 - yl)ethoxy]-ethyl} piperidinium bromide.

8. N-(2-bromo - 4,5 - diethoxy-benzyl)-N-{2-[2-(6,6-dimethyl-norpinan - 2 - yl)ethoxy]-ethyl} piperidinium bromide.

No references cited.

NICHOLAS S. RIZZO, Primary Examiner

J. TOVAR, Assistant Examiner

U.S. Cl. X.R.

260—293.56, 293.62, 326.5 R, 567.6 M, 563 R; 424—248